(12) United States Patent
Hendrickson et al.

(10) Patent No.: US 9,938,086 B2
(45) Date of Patent: Apr. 10, 2018

(54) LOCKING MECHANISM FOR A CONVEYOR

(71) Applicant: Laitram, L.L.C., Harahan, LA (US)

(72) Inventors: Daniel Robert Hendrickson, Cedar Springs, MI (US); Michael Hendrik DeGroot, Rockford, MI (US); Jeff Batchelder, Grand Haven, MI (US)

(73) Assignee: Laitram, L.L.C., Harahan, LA (US)

( * ) Notice: Subject to any disclaimer, the term of this patent is extended or adjusted under 35 U.S.C. 154(b) by 397 days.

(21) Appl. No.: 14/730,835

(22) Filed: Jun. 4, 2015

(65) Prior Publication Data

US 2015/0353286 A1    Dec. 10, 2015

Related U.S. Application Data

(60) Provisional application No. 62/008,286, filed on Jun. 5, 2014.

(51) Int. Cl.
*B65G 21/06* (2006.01)

(52) U.S. Cl.
CPC ......... *B65G 21/06* (2013.01); *Y10T 403/7033* (2015.01)

(58) Field of Classification Search
CPC ..................................................... B65G 21/06
USPC ...................... 198/860.1, 861.1, 866; 70/466
See application file for complete search history.

(56) References Cited

U.S. PATENT DOCUMENTS

| | | | |
|---|---|---|---|
| 3,888,343 A | 6/1975 | Snyder | |
| 5,622,247 A * | 4/1997 | Yamada | B23Q 7/1431 198/345.3 |
| 5,813,513 A * | 9/1998 | Taube | B21D 43/12 198/803.14 |
| 5,839,567 A * | 11/1998 | Kyotani | B61B 10/025 104/172.3 |
| 6,003,656 A * | 12/1999 | Fortenbery | B65G 47/962 198/370.03 |
| 6,321,904 B1 * | 11/2001 | Mitchell | B65G 15/42 198/690.2 |
| 6,367,617 B1 | 4/2002 | Schiesser et al. | |
| 6,705,433 B2 * | 3/2004 | McQuaid | A47F 9/04 186/68 |
| 7,971,702 B2 * | 7/2011 | Johnsgaard | B65G 65/46 198/550.1 |
| 8,393,459 B2 * | 3/2013 | Childs | B65G 45/12 198/497 |

(Continued)

FOREIGN PATENT DOCUMENTS

| | | |
|---|---|---|
| JP | 09-100088 A | 4/1997 |
| WO | 00-78648 A1 | 12/2000 |

OTHER PUBLICATIONS

US PG Pub 2011/0062000 A1, Mar. 17, 2011, Yamamoto (Year: 2011).*

(Continued)

*Primary Examiner* — Douglas A Hess
(74) *Attorney, Agent, or Firm* — Catherine M. Bishop (57) ABSTRACT

A cleanable belt conveyor having a locking mechanism. A locking mechanism including two locking protrusions is used to lock a first conveyor component to a second conveyor component. The locking mechanism comprises a base plate having at least one opening for receiving a locking protrusion and at least one handle plate including the locking protrusion. A saddle extending from one side of the base plate cradles the locking protrusion and may engage a pivot post of a conveyor component.

17 Claims, 6 Drawing Sheets

(56) References Cited

U.S. PATENT DOCUMENTS 8,955,963 B2 * 2/2015 Olejniczak ............ B41F 17/001
198/377.04
2002/0130016 A1 9/2002 Scholz

OTHER PUBLICATIONS

US PG Pub 2013/0026008 A1, Jan. 31, 2013, Childs et al. (Year: 2013).*
US PG Pub 2015/0023769 A1, Jan. 22, 2015, Oberg (Year: 2015).*
US PG Pub 2016/0311622 A1, Oct. 27, 2016, DeGroot et al. (Year: 2016).*
International Search Report and Written Opinion of the International Searching Authority, PCT/US2015/034186, dated Aug. 28, 2015, Korean Intellectual Property Office, Republic of Korea.

* cited by examiner

LOCKING MECHANISM FOR A CONVEYOR

RELATED APPLICATIONS

The present invention claims priority to U.S. Provisional Patent Application Ser. No. 62/008,286 filed Jun. 5, 2014 and entitled "Locking Mechanism for a Conveyor", the contents of which are herein incorporated by reference.

BACKGROUND

The invention relates generally to frames for power-driven conveyors and more particularly to belt conveyor frames that are easy to clean.

In the meat, poultry, fruit, and vegetable industries, conveyor belts are used to transport food products. Most conveyor belts are supported along carryways supported by a frame assembly. To meet USDA sanitation requirements, conveyor belt systems must be cleanable. The conveyor carryway and frame are particularly susceptible to the accumulation of fats, dirt, and debris. Complex connections between different components, a large number of components in the frame and carryway, difficult-to-clean crevices and other issues make cleaning conveyor belt systems problematic at times. In addition, current conveyor systems are difficult to assemble and disassemble to replace and—or clean components.

Thus, there is a need for an easy-to-clean, hygienic conveyor belt system.

SUMMARY

This need and other needs are addressed by a locking system for conveyor components embodying features of the invention. The locking mechanism includes two locking protrusions for engaging recesses in a conveyor component and a saddle for engaging a pivot post on the conveyor component.

According one aspect, a locking mechanism for securing a first conveyor component to a second conveyor component comprises a base plate and a first handle plate coupled to the base plate on a first side. The base plate has first and second openings for receiving locking protrusions. The first handle plate includes a first locking protrusion inserted in the first opening and protruding from a second side of the base plate.

According to another aspect, a locking mechanism for securing a first conveyor component to a second conveyor component comprises a base plate having a first opening for receiving a locking protrusion and a saddle extending from the first opening on the first side. A first handle plate is coupled to the base plate on a second side. The first handle plate includes a first locking protrusion extending from a first side. The first locking protrusion is inserted through the first opening and cradled by the saddle.

According to still another aspect, a locking mechanism for locking a position limiter assembly to a conveyor frame plate is provided. The position limiter assembly includes an end plate, a shaft extending from the end plate and at least one position limiter mounted to the shaft. The locking mechanism comprises a base plate coupled to an outer side of the conveyor frame plate. The base plate includes a first opening and a saddle extending from the first opening on a first side. The saddle passes through a first opening in the conveyor frame plate. A first locking protrusion is inserted through the first opening of the base plate, through the first opening in the conveyor frame plate and through a first opening of the end plate to secure the end plate to the conveyor frame plate.

BRIEF DESCRIPTION OF THE DRAWINGS

These aspects and features of the invention are described in more detail in the following description, appended claims, and accompanying drawings, in which:

DETAILED DESCRIPTION

A sanitary conveyor includes a conveyor frame, a positively-driven conveyor belt, a drive sprocket and a position limiter assembly to ensure proper engagement of the belt and drive sprocket. A locking mechanism secures the position limiter assembly to the conveyor frame. The locking mechanism employs pins or other suitable locking protrusions to easily and securely secure the position limiter assembly, and can be used to secure various conveyor components to a conveyor frame. The invention will be described below relative to certain illustrative embodiments, though the invention is not limited to the illustrative embodiments.

Figure 1A:
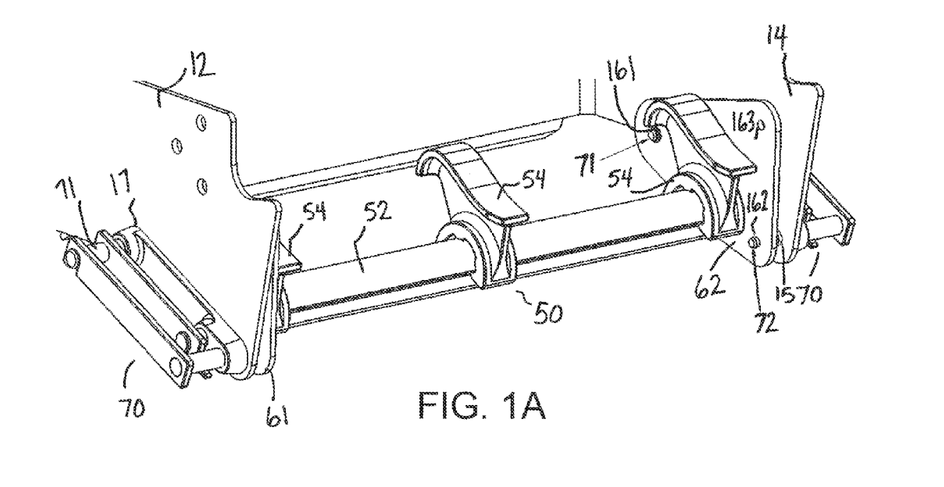
FIG. 1A shows an end of a conveyor including a position limiter assembly mounted to a conveyor frame using a locking mechanism of an embodiment of the invention in an operating position.
Figure 1B:
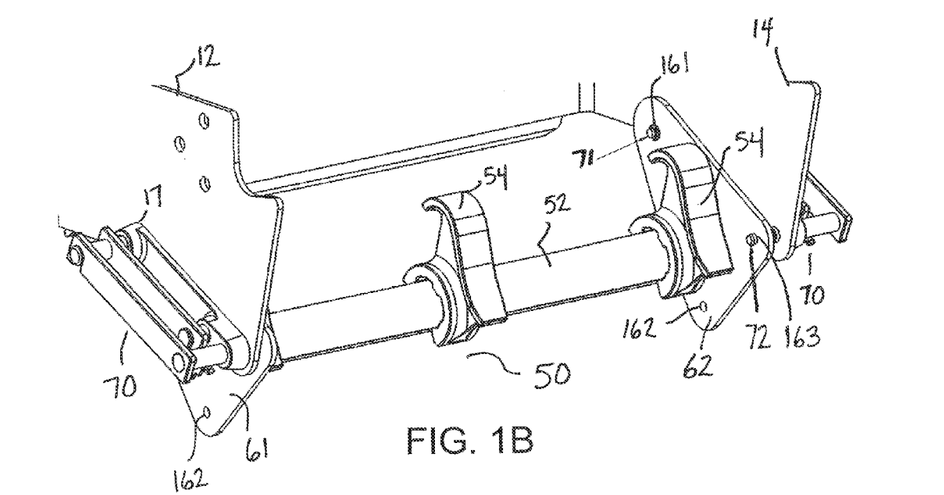
FIG. 1B shows the conveyor end of FIG. 1A in a cleaning position.
Figure 1C:
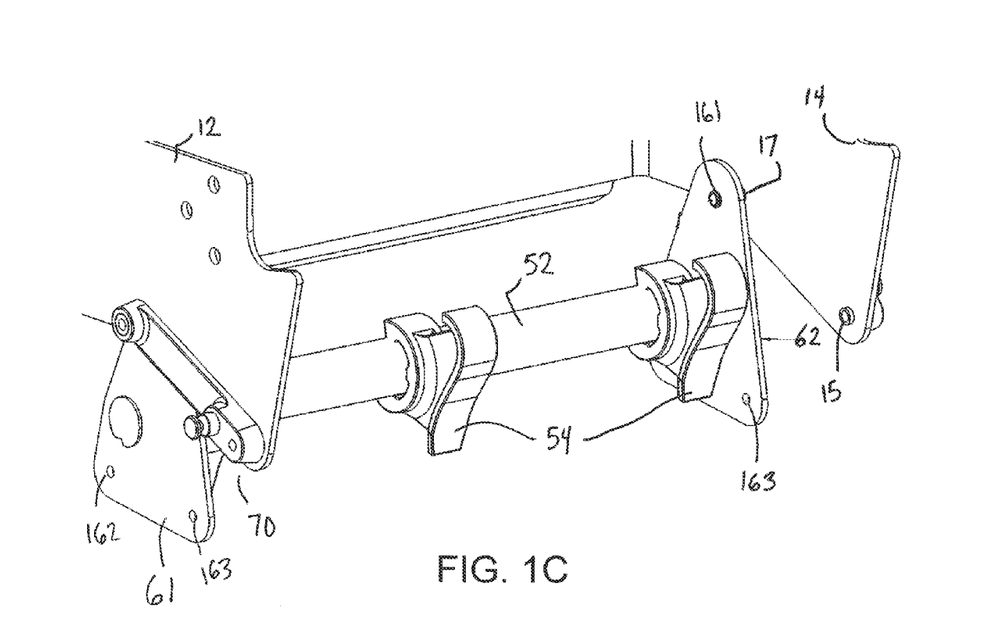
FIG. 1C shows the conveyor end of FIG. 1A in an open position.

FIGS. 1A-1C show a drive end of a conveyor including a position limiter assembly 50 secured to a conveyor frame using locking mechanisms 70 of an embodiment of the invention. The locking mechanism 70 may be used to secure any suitable conveyor component to a conveyor frame or other component. For example, the locking mechanism may be used to secure in-feed components to a frame in a conveyor. The position limiter assembly 50 comprises a shaft 52 having a plurality of position limiters 54 mounted thereon. The position limiters 54 may be mounted to the shaft through a snap-fit connection or other suitable means. The shaft 52 extends between shaft mounting plates 61, 62, which are used to mount the shaft 52 and position limiters 54 to the conveyor frame. The conveyor frame includes conveyor end plates 12, 14 for mounting a sprocket (not shown) or other drive device and receiving the shaft 52. The locking mechanisms 70 lock each shaft mounting plate 61 or 62 to a corresponding conveyor end plate 12 or 14 in a selected position.

As shown, the shaft 52 is mounted between two shaft mounting plates 61, 62, which are mounted to the conveyor frame to position the position limiters 54 relative to the conveyor belt 10. A series of position limiters 54 is mounted along the length of the shaft 52.

The illustrative shaft mounting plates 61, 62 have the shape of a rounded triangle. The shaft 52 is mounted between two points on the plates 61, 62. The shaft mounting plates 61, 62 include openings 161, 162, 163 for engaging the locking mechanism 70 through the conveyor end plates 12, 14.

The shaft assembly may be easily moved into an unengaged position or removed from the conveyor frame, if desired using the locking mechanisms 70.

FIG. 1A shows two locking mechanisms 70 securing the position limiter assembly 50 in an operation mode, with the position limiters 54 positioned adjacent to a drive sprocket to control the position of a conveyor belt. Each locking mechanism 70 secures a shaft mounting plate 61 or 62 to a respective conveyor end plate 12 or 14. Each locking mechanism 70 includes a plurality of locking protrusions, illustrated as pins, for engaging a conveyor component. The illustrative locking protrusions extend through openings in the conveyor end plate 12 or 14 and into the corresponding shaft mounting plate 61 or 62. As shown, each locking mechanism 70 has a first pivot pin 71 that extends through an opening 17 in the corresponding conveyor end plate 12 or 14 and through an opening 161 the corresponding shaft mounting plate 61, 62. Another pin 72 extends through another opening 15 in a corresponding conveyor end plate 12 or 14 and engages the corresponding shaft mounting plate 61 or 62 via opening 162 to secure the position limiter assembly 50 in the operation position. The illustrative locking mechanisms are mirror images of each other, though the invention is not so limited.

FIG. 1B shows two locking mechanisms 70 securing the position limiter assembly in a cleaning mode. In cleaning mode, the pin 72 is released from the opening 162, allowing the assembly 50 to swing down about pivot point 71, exposing the position limiters 54. Then, the pin 72 is inserted through hole 163 in the shaft mounting plates to lock the assembly in the cleaning mode.

FIG. 1C shows the locking mechanisms in a disengaged position, with pins 72 removed. In this position, the pivot pin 71 may remain engaged or may disengage, allowing a pin seat, such as a saddle 81 (described and shown below), to engage the plate 61 or 62, as described below, so that the shaft mounting plates 61, 62 pivot freely about a pivot point.

Figure 2A:
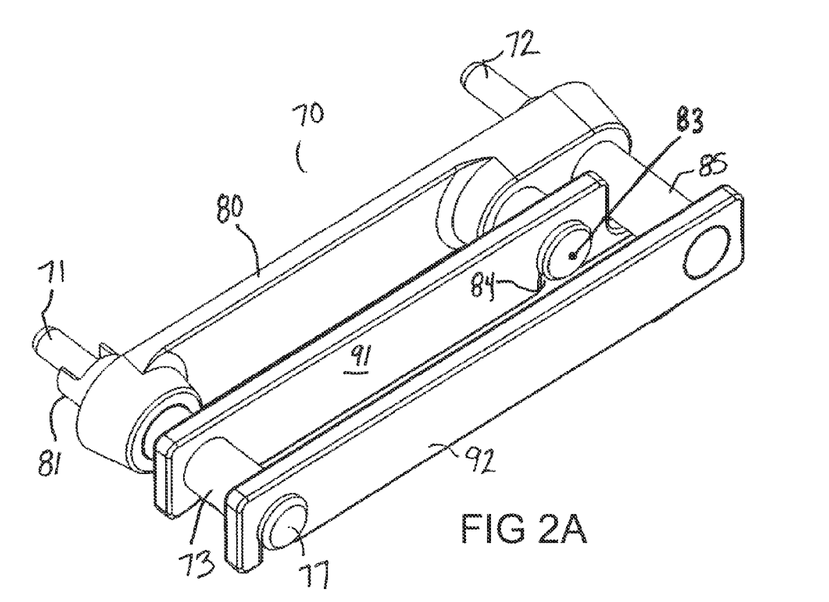
FIG. 2A is a perspective view of a locking mechanism of an embodiment of the invention from an outside position.
Figure 2B:
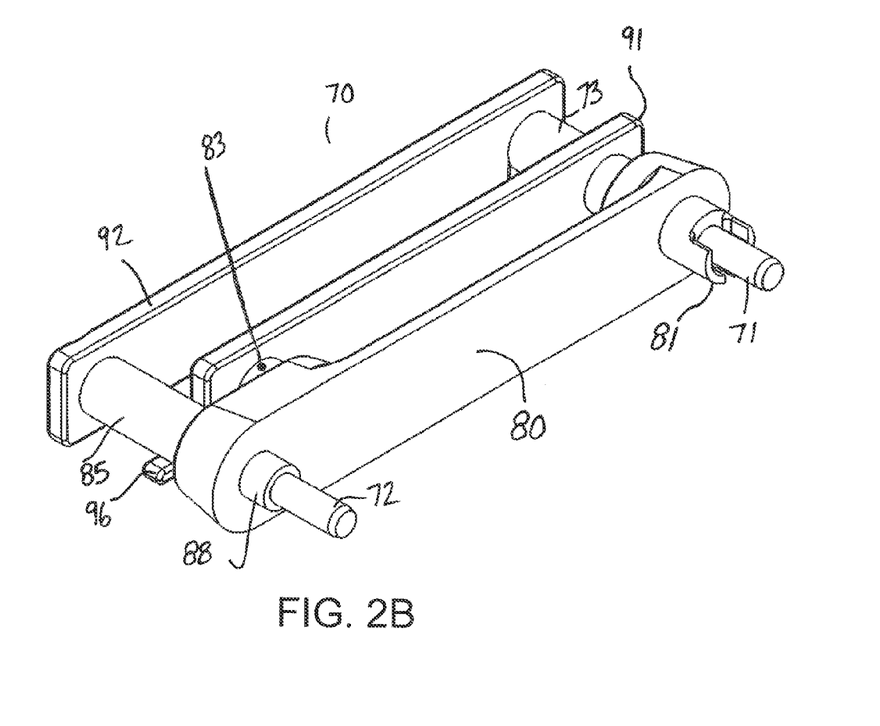
FIG. 2B is an inside perspective view of the locking mechanism of FIG. 2A.
Figure 3:
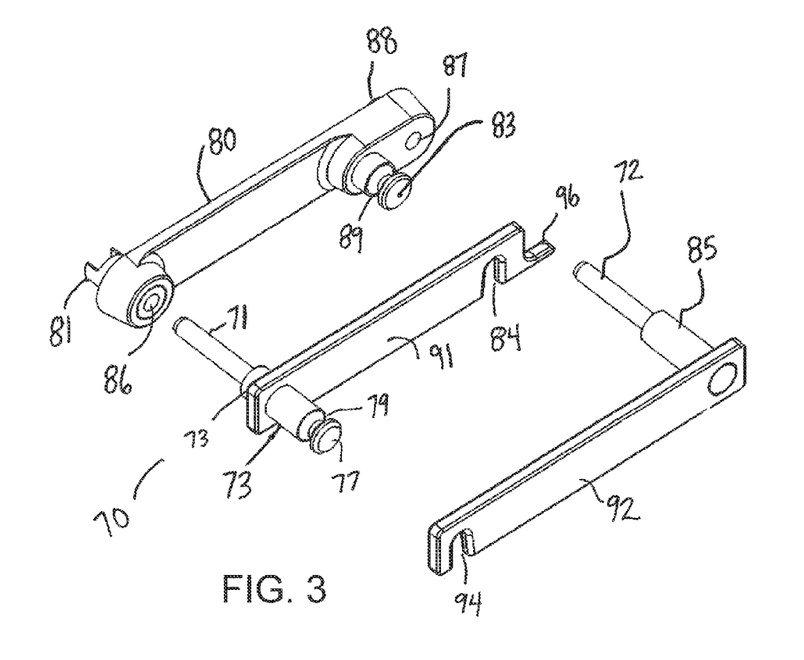
FIG. 3 is an exploded view of the locking mechanism of FIG. 2A.
Figure 4:
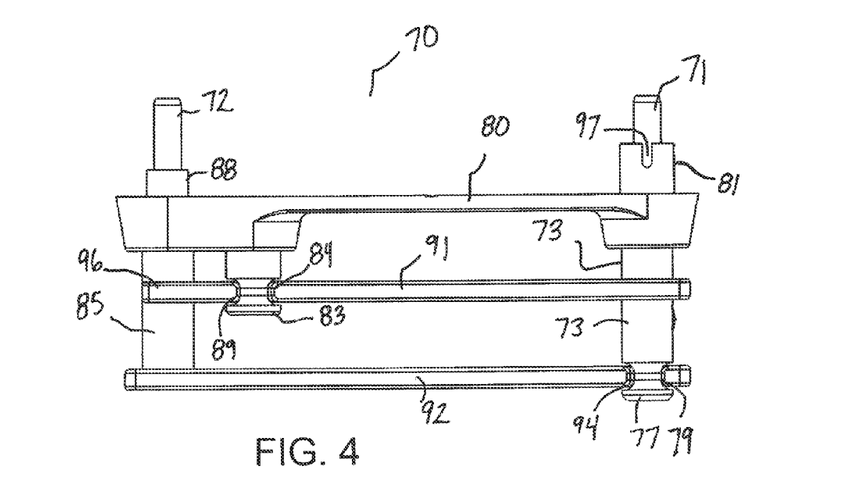
FIG. 4 is a bottom profile view of the locking mechanism of FIG. 2A.

FIGS. 2A and 2B show a locking mechanism 70 of an embodiment of the invention, including two pins 71, 72 for engaging a position limiter assembly. FIG. 3 is an exploded view of the locking mechanism and FIG. 4 is a profile view of the bottom of the locking mechanism 70. Each illustrative locking mechanism 70 includes a base plate 80 and two handle plates 91, 92. The base plate 80 and handle plates 91, 92 are coupled together in a substantially parallel manner, with the base plate 80 and second handle plate 92 sandwiching the first handle plate 91. Preferably, the locking mechanism may be assembled and disassembled without the use of tools.

The base plate 80 includes a first opening 86 for receiving the pivot pin 71 and forms a saddle 81 or other suitable seat for the pivot pin 71 extending from the base on a side that faces the conveyor end plate (forward side). At an opposite end, the base 80 includes a second opening 87 for receiving the second pin 72. A neck 88 protrudes forward from the base and extends the opening 87. When assembled, the pivot pin 71 and second pin 72 extend forward from the base 80. In the illustrative embodiment, the base plate is coupled to the outside of a conveyor end plate 12 or 14, such that the saddle 81 and neck 88 protrude through openings 15, 17 in the conveyor end plate to mount the locking mechanism to the conveyor. The saddle is a coaxial extension of the first opening 86.

The base plate 80 also includes a first post 83 extending from a rearward side of the base between the two openings 86 and 87, but closer to the second opening 87, though the invention is not so limited. The illustrative first post 83 includes a groove 89 so as to form a head for securing the base to the first handle plate 91.

The first handle plate 91 includes the pivot pin 71 extending forward from a first end, with a pin base 73 extending rearward from the first handle plate 91 and also extending slightly forward from the first handle plate 91 to house the pivot pin 71. The pin base 73 includes a groove 79 to form a head 77 for coupling the first handle plate 91 to the second handle plate 92. The first handle plate also includes a slotted opening 84 for receiving the first post 83 of the base 80. The slotted opening 84 receives the groove 89 with the head of the first post 83 protruding rearward through the slotted opening when the first handle plate is coupled to the base. The first handle plate 91 also includes a protruding tab 96 on which the base 85 of the second pin 72 rests when the locking mechanism 70 is assembled, as described below.

The second handle plate 92 includes the second pin 72 extending forward therefrom and includes a base 85 for the second pin 72. At an opposite end from the second pin 72, the second handle plate 92 includes a slotted opening 94 for receiving the head of the pin base 73 on the first handle plate 91.

When assembled, the base 85 for the second pin 72 passes over the tab 96 on the middle handle 91 and towards the opening 87 in the base 80 so that the second pin 72 extends through the opening 87 and protrudes forward from the neck 88 of the base 80.

The post 83 on the base plate 80 engages the first handle plate 91 to limit the rotational movement of the middle plate 91 in a clockwise direction. The slotted opening 84 receives the post 83. The groove 89 also prevents forward or rearward movement of the first handle plate 91 when the post 83 is inserted in the slotted opening 84 of the handle plate 91. The insertion of the second pin 72 in to the base opening 87 also locks the first handle plate 91 rotationally by interference with the tab 96 at the end of the first handle plate 91. The slotted opening 94 of the second handle plate 92 receives the head 77 of the pin base 73 on the first handle plate 91 to prevent counter-clockwise rotation of the second handle plate 92 when the locking mechanism 70 is assembled.

As shown in FIG. 4, the saddle 81 may include a groove 97 or other opening on a bottom thereof for preventing liquids from pooling in the bottom of the channel formed by the saddle 81.

The second handle plate 92 may be removed from the locking mechanism 70 without requiring removal of the base 80 and first handle plate 91, and the first handle plate 91 may be removed without removing the base 80 from engagement with a conveyor component.

To assemble the locking mechanism, the base plate 80 is coupled to the outside surface of a conveyor end plate 12 or 14, with the saddle 81 and neck 88 protruding through openings 15 and 17 of the respective end plate. Then, the first handle plate 91 is coupled to the base plate 80, such that the pin 71 extends through the opening 17, through the saddle 81 and into an opening 161 on the shaft mounting plate 61 or 62. Then, the second handle plate 92 is coupled to the base plate 80 and first handle plate 91 so that the pin 72 is inserted through opening 87 of the base plate 80, through the neck 88, through opening 15 of the conveyor end plate and through a selected opening (162 or 163) in the shaft mounting plate, which is aligned with the opening 15 depending on the desired operational state of the position limiter assembly. Alternatively, one or more of the locking mechanism components may be coupled together before mounting the locking mechanism to the conveyor. The assembly and disassembly of the locking mechanism and locking of the position limiter assembly in a selected position may be accomplished without extra tools.

Figure 5:
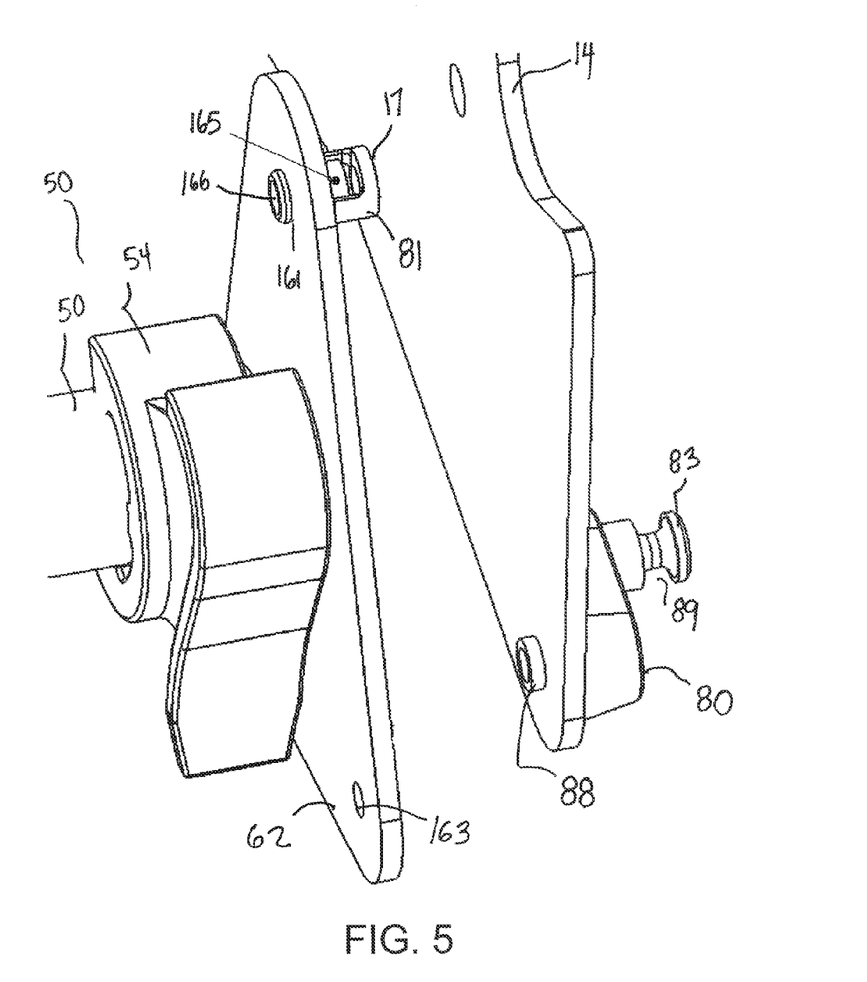
FIG. 5 is a partial close-up view of the conveyor and locking mechanism in an open position.

As shown in FIG. 5, the shaft mounting plate 62 may include a pivot post 165 that enables the limiter assembly 50 to rest in the saddle 81, even if the pivot pin 71 is removed. The pivot post 165 includes an opening 166 for receiving the pivot pin 71 when inserted. The saddle 81 of the locking mechanism 70 includes an upper opening for allowing the pivot post 165 to drop into the seat created by the saddle 81.

Figure 6:
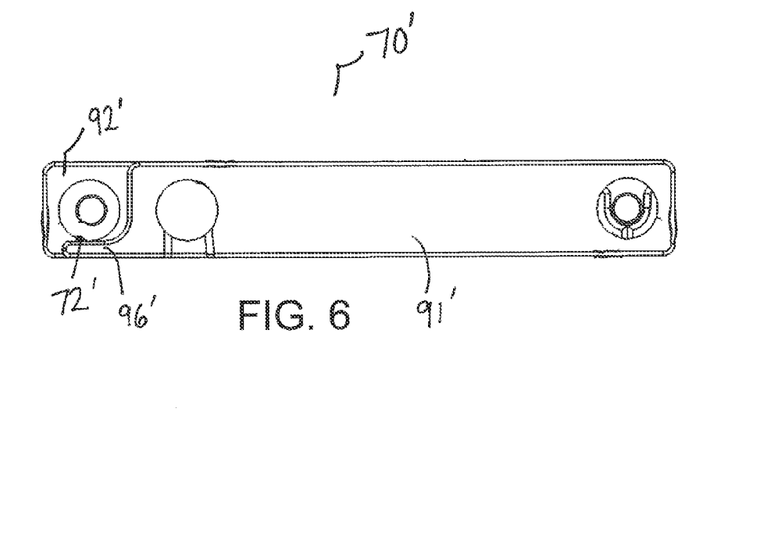
FIG. 6 shows an inside view of a locking mechanism according to another embodiment of the invention.

FIG. 6 is a front view of a locking mechanism 70' of another embodiment of the invention. In the embodiment of FIG. 6, the second pin handle 92' includes an eccentric locking pin 72'. When the second handle plate 92' is coupled to the first handle plate 91' such that the eccentric locking pin 72' is inserted in the opening 87 of the base plate, it experiences an interference from the extending tab 96' of the first handle plate 91'. As the extending tab 96' deflects and the eccentric locking pin 72' is rotated over center, the second handle plate 92' locks into place. In this manner, all components of the dual-protrusion locking mechanism may be secured into position without the use of tools.

Figure 7:
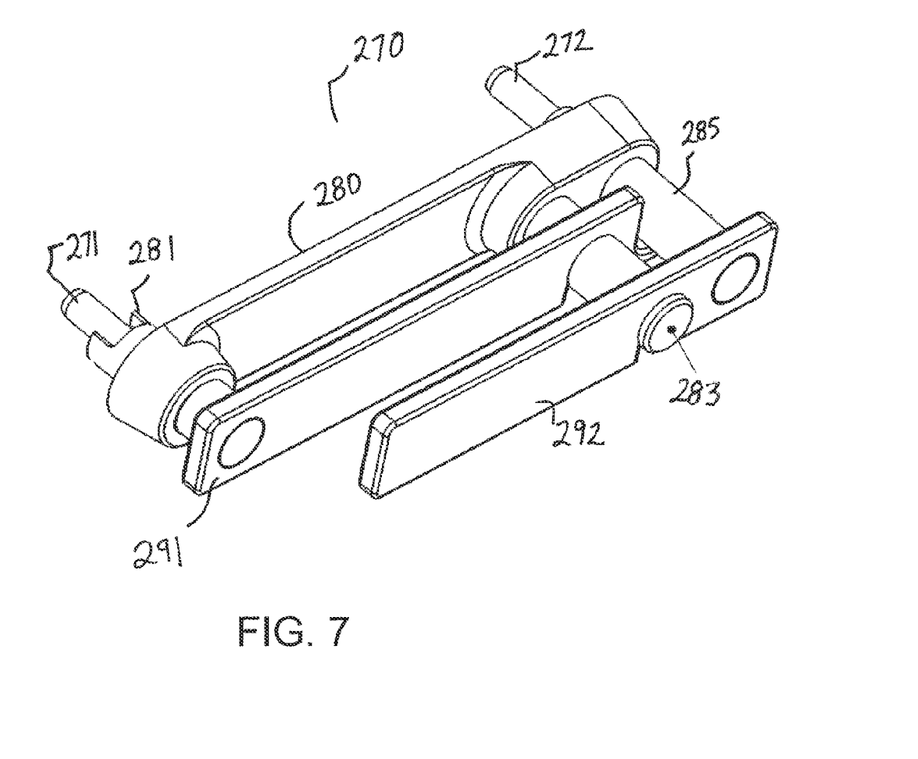
FIG. 7 is an isometric view of a locking mechanism of another embodiment.

FIG. 7 shows another embodiment of a locking mechanism 270 for a conveyor component. The locking mechanism 270 is similar to the embodiments described above, including a base plate 280 with openings and a saddle 281, first handle plate 291 having a first pin or other locking device 271 and a second handle plate 292 with a second pin or other locking device 272 extending from a base 285. In the embodiment of FIG. 7, the second handle plate 292 is locked axially by engaging a notched post 283 that protrudes from the base plate 280 or elsewhere. In the embodiment of FIG. 7, the second handle plate 292 is shorter than the base plate 280 and the first handle plate 291, though the invention is not so limited.

The use of lock-in-place components for a conveyor frame ensures a secure, hygienic connection with minimal rotation of the component and no axial movement, if desired. The components are easy to deploy, reconfigurable, reusable, resulting in a sanitary, versatile conveyor.

Although the invention has been described with reference to specific versions, other versions are possible. The scope of the invention is not meant to be limited to the exemplary versions described in detailed.

What is claimed is:

1. A locking mechanism for securing a first conveyor component to a second conveyor component, comprising:
    a base plate having a first opening and a second opening for receiving locking protrusions;
    a first handle plate coupled to the base plate on a first side, the first handle plate including a first locking protrusion inserted in the first opening and protruding from a second side of the base plate; and
    a second handle plate coupled to the base plate and the first handle plate, such that the first handle plate is between the second handle plate and the base plate, the second handle plate including a second locking protrusion inserted in the second opening and protruding from the second side of the base plate.

2. The locking mechanism of claim 1, wherein the base plate, first handle plate and second handle plate have planar portions that are parallel to each other.

3. The locking mechanism of claim 1, wherein the base plate includes a saddle extending from the second side for engaging a pivot post of a conveyor component.

4. The locking mechanism of claim 3, wherein the saddle includes an upper opening for allowing insertion of the pivot post into a channel formed by the saddle.

5. The locking mechanism of claim 1, wherein the base plate includes a grooved post extending from the first side for engaging a slotted opening in the first handle plate.

6. The locking mechanism of claim 1, wherein the first handle plate includes a grooved post extending opposite the locking protrusion for engaging a slotted opening in the second handle plate.

7. The locking mechanism of claim 1, wherein the first handle plate includes a protruding tab extending from one end for supporting the locking protrusion extending from the second handle plate.

8. A locking mechanism for securing a first conveyor component to a second conveyor component, comprising:
    a base plate having a first opening for receiving a locking protrusion, a saddle extending from the first opening on a first side, and a second opening having a neck protruding from the first side to extend the second opening; and
    a first handle plate coupled to the base plate on a second side, the first handle plate including a first locking protrusion extending from a first side, the first locking protrusion inserted through the first opening and cradled by the saddle.

9. The locking mechanism of claim 8, wherein the first handle plate includes a slotted opening for receiving a protrusion extending from the second side of the base plate.

10. The locking mechanism of claim 8, further comprising a second handle plate having a second locking protrusion, wherein the second locking protrusion is inserted in a second opening of the base plate.

11. The locking mechanism of claim 10, wherein the first handle plate includes a protruding tab for supporting a base of the second locking protrusion.

12. The locking mechanism of claim 10, wherein the first handle plate has a protrusion extending from a second side and the second locking plate has a slotted opening for receiving the protrusion.

13. A locking mechanism for locking a position limiter assembly to a conveyor frame plate, the position limiter assembly including an end plate, a shaft extending from the end plate and at least one position limiter mounted to the shaft, the locking mechanism comprising:
    a base plate coupled to an outer side of the conveyor frame plate, the base plate including a first opening and a saddle extending from the first opening on a first side, the saddle passing through a first opening in the conveyor frame plate; and
    a first locking protrusion inserted through the first opening of the base plate, through the first opening in the conveyor frame plate and through a first opening of the end plate to secure the end plate to the conveyor frame plate.

14. The locking mechanism of claim 13, wherein the base plate further comprises a second opening having a collar extending from the first side of the base plate.

15. The locking mechanism of claim 14, wherein the collar extends through a second opening in the conveyor frame plate.

16. The locking mechanism of claim 15, further comprising a second locking protrusion extending through the second opening of the base plate, the second opening of the conveyor frame plate and a second opening of the end plate.

17. The locking mechanism of claim 13, wherein the first locking protrusion is coupled to the second locking protrusion.

* * * * *